United States Patent
Dunn et al.

(10) Patent No.: US 9,521,529 B1
(45) Date of Patent: Dec. 13, 2016

(54) AUTOMATED SHORT MESSAGE FORMATTING COMMANDED BY EMBEDDED SPECIALTY CODES

(71) Applicant: Sprint Communications Company L.P., Overland Park, KS (US)

(72) Inventors: Scott M. Dunn, Overland Park, KS (US); Kari A. Galliart, Overland Park, KS (US); Kenneth R. Steele, Overland Park, KS (US); Louis E. Wingo, Liberty, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 90 days.

(21) Appl. No.: 14/577,935

(22) Filed: Dec. 19, 2014

(51) Int. Cl.
*H04W 4/00* (2009.01)
*H04W 4/14* (2009.01)
*H04M 1/725* (2006.01)

(52) U.S. Cl.
CPC ........... *H04W 4/14* (2013.01); *H04M 1/72552* (2013.01)

(58) Field of Classification Search
None
See application file for complete search history.

(56) References Cited

U.S. PATENT DOCUMENTS

| | | | | |
|---|---|---|---|---|
| 6,473,621 B1* | 10/2002 | Heie | ................... | H04M 1/2472 340/7.31 |
| 7,991,424 B2* | 8/2011 | Batni | .............. | H04M 1/274583 340/573.1 |
| 8,219,067 B1* | 7/2012 | Haldar | .............. | H04M 1/72547 455/412.1 |
| 2003/0100322 A1* | 5/2003 | Jeon | .................. | H04M 1/72552 455/466 |
| 2004/0137922 A1* | 7/2004 | Kang | ...................... | H04W 4/20 455/466 |
| 2004/0266462 A1* | 12/2004 | Chava | ................. | H04W 88/184 455/466 |
| 2005/0125217 A1* | 6/2005 | Mazor | ................... | G06F 17/273 704/1 |
| 2006/0128404 A1* | 6/2006 | Klassen | ............... | H04L 12/586 455/466 |
| 2006/0129633 A1* | 6/2006 | Potluri | ................... | G06F 17/22 709/203 |

* cited by examiner

*Primary Examiner* — German J Viana Di Prisco (57) ABSTRACT

A mobile communication device. The mobile communication device comprises a long-range radio transceiver, a processor, a memory, an input device, and an application, stored in the memory. When executed by the processor the application receives input from the input device, wherein the input comprises text symbols having an initial format and at least one specialty code, creates a short message comprising the text symbols formatted in a transmission format based on a formatting command identified by the at least one specialty code, wherein the transmission format is different from the initial format, and transmits the short message via the long-range radio transceiver.

19 Claims, 7 Drawing Sheets

AUTOMATED SHORT MESSAGE FORMATTING COMMANDED BY EMBEDDED SPECIALTY CODES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are widely used throughout the developed world. These devices provide mobile voice call services, mobile internet browsing services, mobile email services, mobile text (short message service) message services, multi-media (MMS) message services, tweeting services, and other services. The input devices of mobile communication devices may be small and/or cramped due to the desire to keep mobile communication devices small, light, and easily portable.

SUMMARY

In an embodiment, a mobile communication device is disclosed. The mobile communication device comprises a long-range radio transceiver, a processor, a memory, an input device, and an application, stored in the memory. When executed by the processor the application receives input from the input device, wherein the input comprises text symbols having an initial format and at least one specialty code, creates a short message comprising the text symbols formatted in a transmission format based on a formatting command identified by the at least one specialty code, wherein the transmission format is different from the initial format, and transmits the short message via the long-range radio transceiver.

In an embodiment, a method of creating and wirelessly transmitting a short message by a mobile communication device is disclosed. The method comprises receiving input from a keyboard of a mobile communication device, wherein the input comprises text symbols having an initial format and at least one specialty code and creating a short message comprising the text symbols formatted in a transmission format by a short message application executing on the mobile communication device based on a formatting command identified by the at least one specialty code, wherein the transmission format is different from the initial format. The method further comprises transmitting the short message via a long-range radio transceiver of the mobile communication device.

In yet another embodiment, a mobile communication device is disclosed. The mobile communication device comprises a long-range radio transceiver, a processor, a memory, an input device, and an application, stored in the memory. When executed by the processor the application receives a short message comprising text symbols and at least one specialty code via the long-range radio transceiver and, based, on the at least one specialty code, suppresses presentation of an alert about the reception of the short message in response to the event of receiving the short message. Based on the at least one specialty code, the application further presents the alert about the reception of the short message in response to a second event identified by the at least one specialty code, wherein the second event is different from the event of receiving the short message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches using specialty codes embedded by a user in a short message (e.g., a text message, a MMS message, or other short message) to command automated formatting of the text message on a mobile communication device. For example, a user may type in a text message and place a specialty code in the text message input. After the user clicks the send button, a texting application executing on the mobile communication device that is sending the text message parses the text message input by the user, identifies and removes the specialty code, reformats the initial text message in a transmission format based on a formatting function or command identified by the specialty code, and transmits the transmit text message.

The specialty code may command that the characters of the initial text message all be upper cased, that the characters of the initial text message be separated by spaces, that each word of the initial text message be placed on separate lines, and other reformatting. The specialty code may command the texting application to defer transmission of the text message by the mobile communication device for a period of time or until a scheduled time indicated by the code. While text messaging is often used as an example short message technology herein, it is understood that the teachings of the present disclosure are applicable to other short message formats, for example multi-media message service (MMS) messages, tweets, instant messages (IM), and others.

The texting application may provide a control for the user to select formatting the input text message and presenting the reformatted text for review by the user. The user may further edit the reformatted text, for example correcting typographical errors. In an embodiment, the user may add an additional specialty code to the reformatted text, thereby causing the initial input text message to be processed with two or more formatting commands in succession. After the user has reviewed the reformatted text message, the user may select to transmit the transmit text message. Alternatively, the user may provide the initial text message input and embed two or more specialty codes, and the texting application may process the initial text message input by performing the processing commanded by the two or more specialty codes embedded in the initial text message input.

The texting application may store the transmit text message for future reference and not store the initial text message. The specialty code may command that the text message not be stored on the mobile communication device as would be customary. The specialty code may command that the words of the initial text message be translated into a foreign language, and the foreign language translation be transmitted. In the case of translating, the texting application may store both the initial untranslated text message and the translated text message.

Some specialty codes may identify actions to be taken by a texting application on a called mobile communication device (the device to which a text message is addressed or directed to) and hence these specialty codes are sent along with the text message to the called device. These destination specialty codes may direct the called device to suspend presenting an alert to the user of the called device on the event of the text message being received, either temporarily or permanently. For example, the destination specialty code may command that the called device present an alert associated with the text message after a delay of a time interval coded in the specialty code, present the alert at a scheduled time coded in the specialty code, present the alert after the called device detects that it has been moved (e.g., a 3-axis gyroscope on the called device detects motion). The destination specialty code may command that the called device not present an alert associated with the text message until the called device is at a location designated by the specialty code or within a pre-defined radius of a location designated by the specialty code. The destination specialty code may command that the text message be deleted by the texting application on the called device after one-time presentation of the text message.

Some of the automated formatting described above (but not all) can be achieved by careful, painstaking manual input by a user. For example, a user can manually add spaces between every letter of the text message. But this is a time wasting process, and few users have the patience for it. Additionally, errors occur, and it is tedious to find and fix such errors. The specialty codes taught by the present disclosure makes such formatting both easier and more consistent. Further, some of the specialty codes support functionality that simply is not available currently, for example one-time presentation of text messages, aural alert suppression, aural alert delay, etc. With the exception of some specialty codes that may designate a one-time display at the receiving device, a silent display at the receiving device, or a delayed display at the receiving device, the formatting functions are all performed by the sending device or by a server computer in the network and may be said to be transparent to the receiving device.

Figure 1:
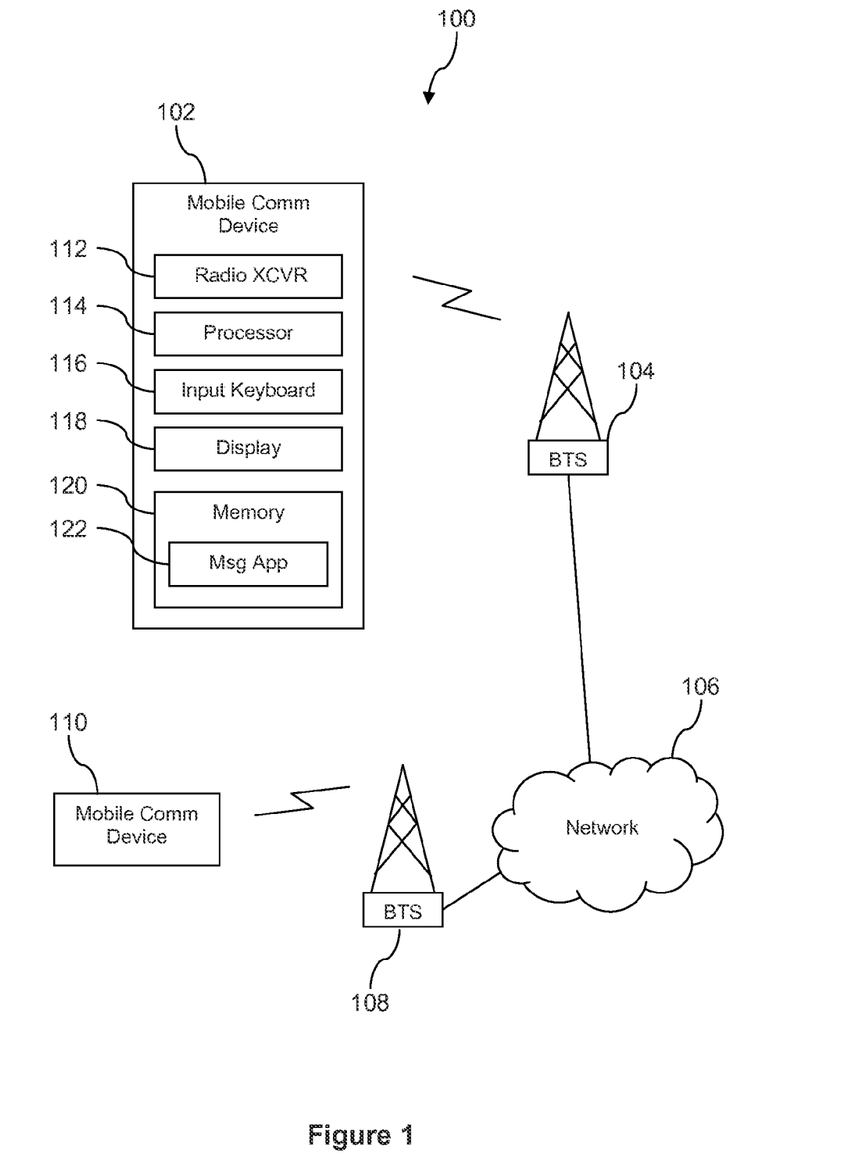
FIG. 1 is a block diagram of a communication system according to an embodiment of the disclosure.

Turning now to FIG. 1, a communication system 100 is described. In an embodiment, the system 100 comprises a first mobile communication device 102 that sends a short message to a second mobile communication device 110 via communication links provided by a first base transceiver station (BTS) 104 or enhanced node B (eNB), a network 106, and a second BTS 108 or eNB. The first mobile communication device 102 comprises a long-range radio transceiver 112, a logic processor 114, an input keyboard 116, a display 118, and a memory 120 that stores a short message application 122. The second mobile communication device 110 may comprise substantially similar structural components to those attributed to the first mobile communication device 102. In an embodiment, however, the second mobile communication device 110 does not comprise a short message application 122 that is configured to parse and respond to specialty codes embedded in short messages. Said in other words, the second mobile communication device 110 may be a legacy device.

The BTSs 104, 108 provide wireless communication links to the mobile communication devices 102, 110 according to one or more of a code division multiple access (CDMA) wireless protocol, a global system for mobile communication (GSM) wireless protocol, a long-term evolution (LTE) wireless protocol, or a worldwide interoperability for microwave access (WiMAX) wireless protocol. The network 106 may comprise one or more public networks, one or more private networks, or a combination thereof. The BTSs 104, 108 are communicatively coupled to the network 106 by wired communication links or by wireless communication links. While two BTSs 104, 108 are depicted in FIG. 1, the system 100 may comprise any number of BTSs. Likewise, while two mobile communication devices 102, 110 are depicted in FIG. 1, the system 100 may comprise any number of mobile communication devices. The long-range radio transceiver 112 may be referred to as a cellular radio transceiver in some contexts, and is configured to communicate according to one or more of CDMA, GSM, LTE, WiMAX, or another cellular wireless communication protocol. As used herein, the term long-range means that the maximum range of radio communication for the long-range radio transceiver is at least 1 mile, at least 2 miles, or at least 5 miles. It is understood that the long-range radio transceiver 112 may also communicate with the BTS 104 over shorter ranges than its maximum communication range.

In an embodiment, a user of the first mobile communication device 102 sends a short message based on specialty codes to the second mobile communication device 110. The first mobile communication device 102 in this scenario may be said to play the role of the calling device, and the second mobile communication device 110 may be said to play the role of the called device. Alternatively, the first mobile device 102 in this scenario may be said to play the role of the call originator, and the second mobile communication device 110 may be said to play the role of the call terminator, call end point, or call destination. The short message may be a short message service (SMS) message or text message. The short message may be a multi-media service (MMS) message. The short message may be a tweet or an instant message (IM). The short message may be another form of non-email short message. The mobile communication devices 102, 110 may be a mobile phone, a personal digital assistant (PDA), a media player, a tablet computer, a notebook computer, or a laptop computer. The first mobile communication device 102 may be a different category of mobile device from the second mobile communication device 110.

The user keys in or inputs text symbols using the input keyboard 116 while the short message application 122 is active. The text symbols may include upper case letters, lower case letters, numbers, punctuation marks, and special characters that may be provided by the keyboard such as #, &, %, @, and others. The text symbols comprise the information content desired to be conveyed to the user of the second mobile communication device 110. The user also keys in a specialty code. A specialty code may comprise a special character followed by a code. For example, in an embodiment, a specialty code may comprise the special character # followed by two number characters. Thus, #15 may comprise a specialty code that commands the short message application 122 to add a space between each of the text symbols to format a transmission short message (e.g., a short message in the format that will be transmitted from the first mobile communication device 102 to the second mobile communication device 110). Note that an occurrence of # that is NOT followed by two number characters may not be construed by the short message application 122 as a specialty code. The short message application 122 also is able to send short messages from input text that contain no specialty codes, in which case the transmitted short message is substantially formatted in the way input by the user.

In some contexts, the specialty code may be referred to as a substring within a longer string, for example a substring of 3 text symbols within a longer string of 163 text symbols. In an embodiment, the short message application 122 may comprise a parser component and a formatting component. The parser may parse the input text symbol string until the # text symbol is encountered, then the parser may analyze the one, two, or three text symbols following to determine if the substring of the # and following text symbols form a valid specialty code. If the parser determines that the substring does not form a valid specialty code, the # text symbol and following text symbols may be processed by the formatting component as ordinary text symbols (e.g., does not perform any special formatting on the # text symbol and following text symbols and passes the # text symbol to the transmit message). If, however, the parser determines that the substring forms a valid specialty code, the formatting component of the short message application 122 formats the input text symbol string based on the embedded specialty code.

While the special character # is used as an example throughout this specification, it is understood that in another embodiment, other special characters may be used to build a specialty code. Likewise, while numerals are used as an example throughout this specification to designate codes, it is understood that in another embodiment, letters may be used to designate codes or other special characters may be used to designate codes. Thus &O in another embodiment may command the addition of a space between each text symbol. Thus #@ in another embodiment may command the addition of a space between each text symbol.

The specialty codes may be placed at the end of the text symbol input. Alternatively, the specialty codes may be placed within the text symbol input. In an embodiment, a first specialty code may be placed in two places within the text symbol input (the two substring specialty codes may be enclosed by text symbols that do not comprise a substring specialty code), and in this case the formatting command may be applied by the short message application 122 to only the text symbols that are bracketed by the first specialty code. Said in other words, in this example the first occurrence of the specialty code may "turn on" the subject formatting command and the second occurrence of the specialty code may "turn off" the subject formatting command.

Figure 2A:
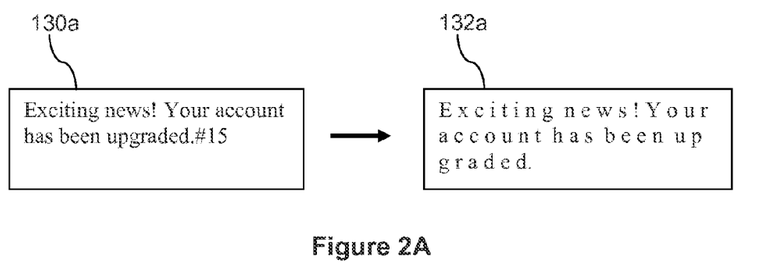
FIG. 2A is an illustration of reformatting a short message based on a first specialty code according to an embodiment of the disclosure.
Figure 2B:
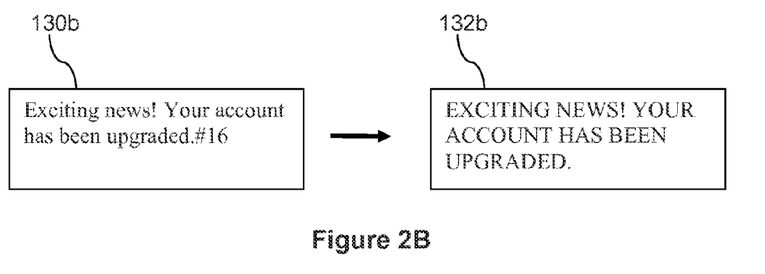
FIG. 2B is an illustration of reformatting a short message based on a second specialty code according to an embodiment of the disclosure.
Figure 2C:
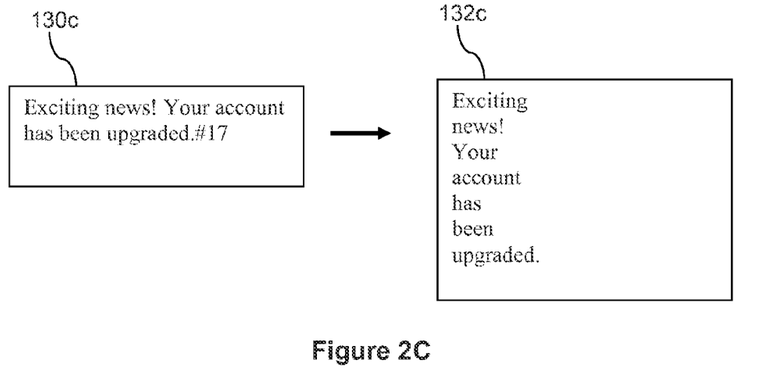
FIG. 2C is an illustration of reformatting a short message based on a third specialty code according to an embodiment of the disclosure.

Turning now to FIG. 2A, FIG. 2B, and FIG. 2C, example text input reformatting processes are discussed. A user inputs text characters having the information content "Exciting news! Your account has been upgraded" in each of the input windows 130. In a first input window 130*a*, the user embeds a #15 specialty code that commands the short message application 122 to insert a space between each text symbol. In a first transmission window 132*a* the input text is shown reformatted by the short message application 122 in a transmission format commanded by the #15 specialty code. In a second input window 130*b*, the user embeds a #16 specialty code that commands the short message application 122 to upper case each text symbol. In a second transmission window 132*b* the input text is shown reformatted by the short message application 122 to upper case each letter symbol. In a third input window 130*c*, the user embeds a #17 specialty code that commands the short message application 122 to insert a line break after each word formed by the input letter symbols. In a third transmission window 132*c* the input text is shown reformatted by the short message application 122 in a transmission format commanded by the #17 specialty code. It is understood that other specialty codes commanding other reformatting functions are contemplated by the present disclosure. Additionally, it is understood that different specialty codes may be employed to designate the subject reformatting functions.

The transmission window 132 represents the short message that is created by the short message application 122 based on the input text symbols and the input specialty code. The contents of the transmission window 132 may be stored in the memory 120 after the short message is sent to the second mobile communication device, for example on a short message thread log or thread history. Alternatively, the user may be able to invoke a command of the short message application 122 that causes the reformatted transmission message to be presented on the display 118 before the user clicks the short message transmit button.

This function may promote the user correcting any errors in the text. This function may further promote processing the original input text symbols based on a succession of specialty codes. For example, the user may use a first specialty code to reformat the initial short message in a first way, cause the reformatted short message to be presented in the display 118, embed a second specialty code in the reformatted short message, cause the twice reformatted short message to be presented in the display 118, and then click the send button to send the twice reformatted short message to the second mobile communication device 110. In another embodiment, the short message application 122 may support processing a plurality of specialty codes in a single input window 130 to perform two reformatting functions at substantially one time, at least from the viewpoint of the user. A specialty code may command that the short message application 122 not send the input short message until after a time delay or until a scheduled time coded in the specialty code.

A specialty code may command that a short message not be stored in the memory 120 when it is transmitted to the second mobile communication device 110, for example omitting the transmitted short message from a history or thread of short messages exchanged between the devices 102, 110. In some contexts this may be referred to as a ghost message. A specialty code may command that a short message not be stored in the memory 120 when it is transmitted to the second mobile communication device 110 and command that the short message be deleted from the second mobile communication device 110 and not be stored in its memory after a one-time presentation of the subject short message on a display of the second mobile communication device 110. This specialty code may further command that the subject short message not be forwarded by the second mobile communication device 110 to any other mobile communication device. Thus, it is contemplated that some specialty codes command short message processing actions on both the calling device and the called device. This kind of specialty codes would not be deleted from the short message by the short messaging application 122 before transmitting the short message to the called device.

One or more specialty codes may command processing to be performed on the called device. For example, some specialty codes may command that a customary alerting presentation (e.g., an aural alert or a vibration alert) not be provided on the event of receipt of the subject short message by the called device. The specialty code may command that presentation of receipt alerts be delayed by a period of time encoded in the specialty code, be presented at a scheduled time encoded in the specialty code, or be presented in response to a triggering event on the called device, such as detection of motion of the called device. One specialty code may command that the aural alert not be presented by the called device until the called device is in a location coded in the specialty code or within a pre-defined radius of the location. The specialty code may command that presentation of a receipt alert be suppressed completely (e.g., no receipt alert is provided, the subject short message is simply in the short message receipt queue for consumption. The suppression of a receipt alert need not exclude presenting a silent indication of an unconsumed or a received short message, for example a "1" presented in a colored circle superimposed on a short messaging application icon on a user interface of the called mobile communication device. This kind of specialty code may avoid disturbing the user of the called device when they are sleeping or engaged in a meeting or other activity. This kind of specialty codes would not be deleted from the short message by the short messaging application 122 before transmitting the short message to the called device. In an embodiment—with the exception of the one-time presentation of a short message without storage on the called device, of the suppression of the short message receipt alert, of the delay of short message receipt alerts, and or the triggering of short message receipt alerts based on a location criteria—the processing of the short message received by the called device does not involve translation by the called device. Said in other words, with the noted exceptions, the short message post formatting by the calling device is completely standard and requires no translation before presentation by the called device.

Figure 3:
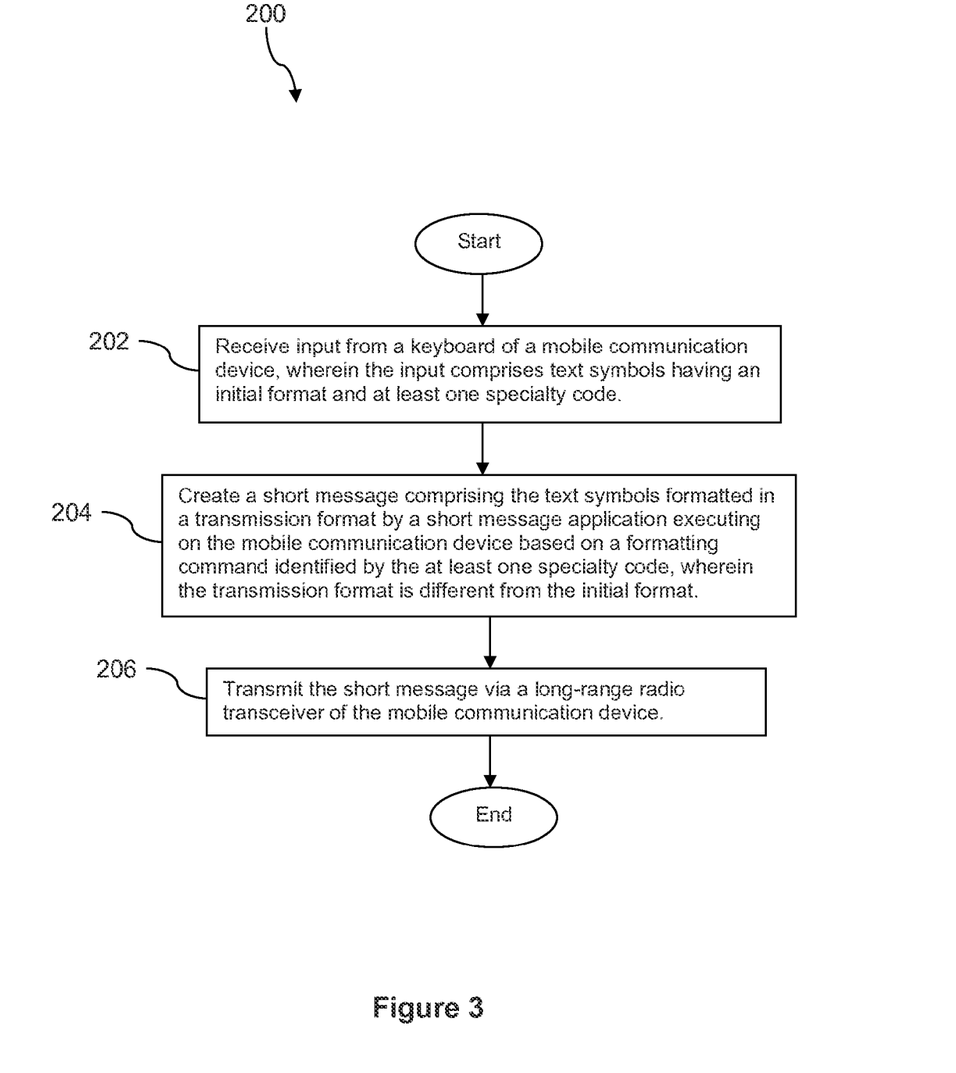
FIG. 3 is a flow chart of a method according to an embodiment of the disclosure.

Turning now to FIG. 3, a method 200 is described. At block 202, an input is received from a keyboard of a mobile communication device, wherein the input comprises text symbols having an initial format and at least one specialty code, such as a specialty code as described further above. At block 204, a short message is created comprising the text symbols formatted in a transmission format by a short message application executing on the mobile communication device based on a formatting command identified by the at least one specialty code, wherein the transmission format is different from the initial format. For example, the short messaging application 122 reformats the input based on a specialty code. FIGS. 2A, 2B, and 2C provide examples of the kinds of reformatting that might be commanded by the specialty code, but other specialty codes are also contemplated by the present disclosure. In an embodiment, the reformatted input may be presented on a display of the mobile communication device. In an embodiment, the specialty code or codes may be removed from the short message when the short message is reformatted. Alternatively, one or more specialty codes may be left in the reformatted short message, for example when a specialty code commanding action to the called device, for example commanding delay or suppression by the called device of an aural alert on the event of the called device receiving the short message.

At block 206, the short message is transmitted via a long-range radio transceiver of the mobile communication device, for example the short message that has been reformatted by the short messaging application 122 is transmitted by the long-range radio transceiver 112 of the first mobile communication device 102 to the first BTS 104; the first BTS 104 transmits the short message to the network 106; the network 106 transmits the short message to the second BTS 108; and the second BTS 108 transmits the short message to the second mobile communication device 110. In an embodiment, the processing of steps 202 and 204 may be repeated one or more times before performing step 206, for example when the user revises the input to correct errors, to add further text content, and/or to provide a succession of specialty codes.

Figure 4:
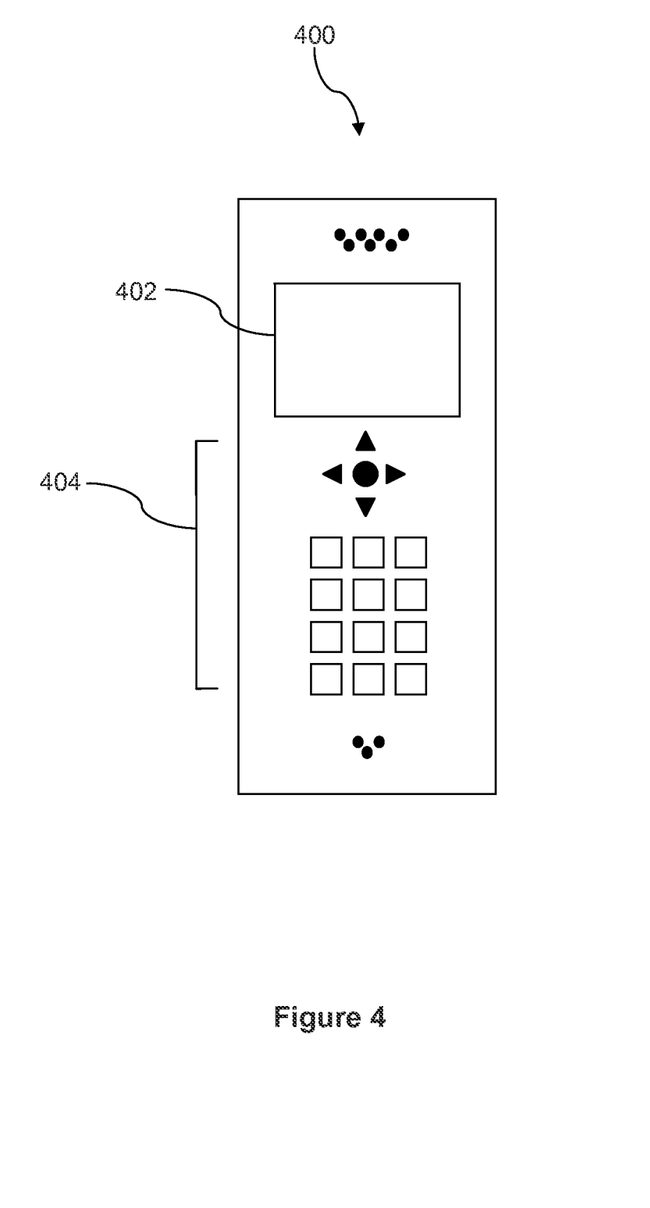
FIG. 4 is an illustration of a handset according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
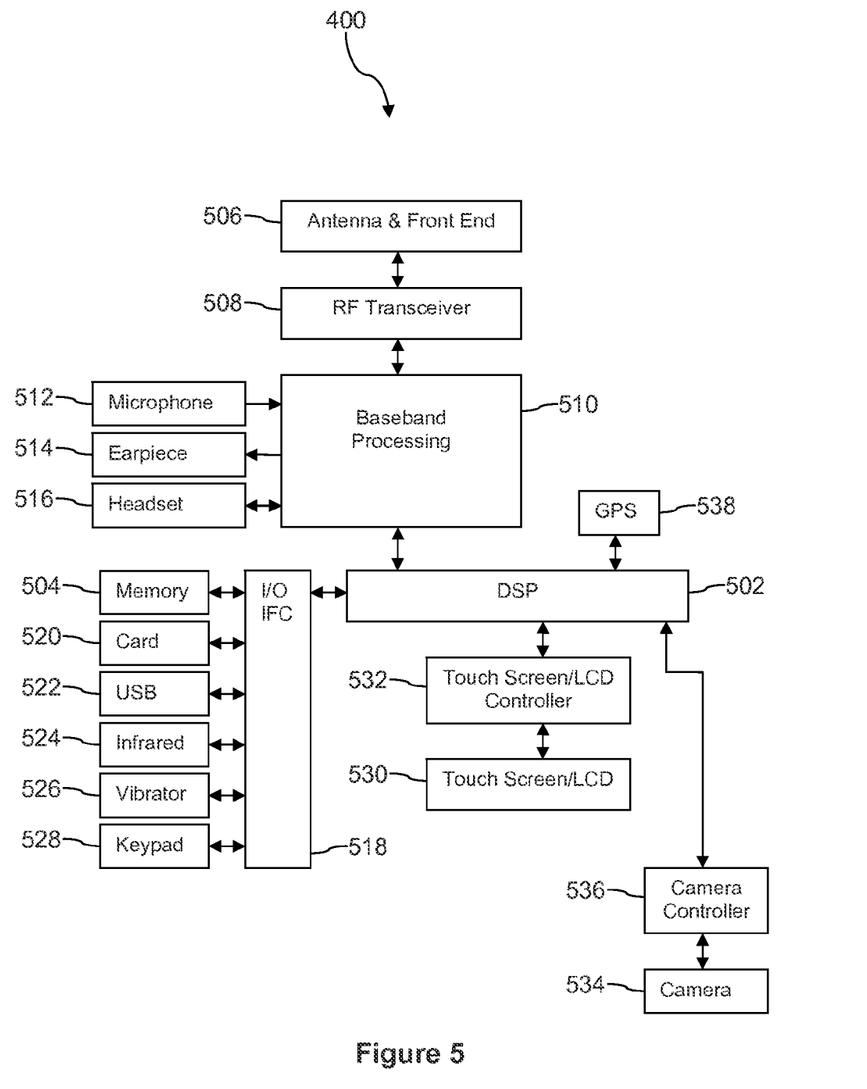
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations. In an embodiment, the mobile device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
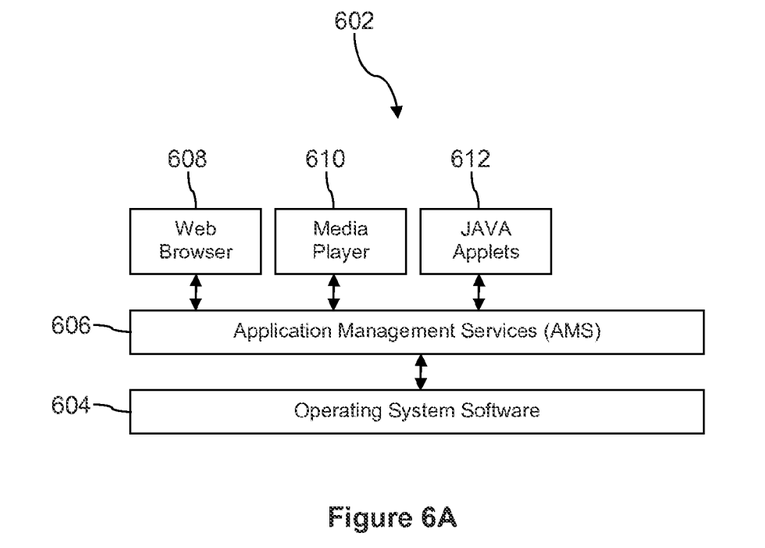
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
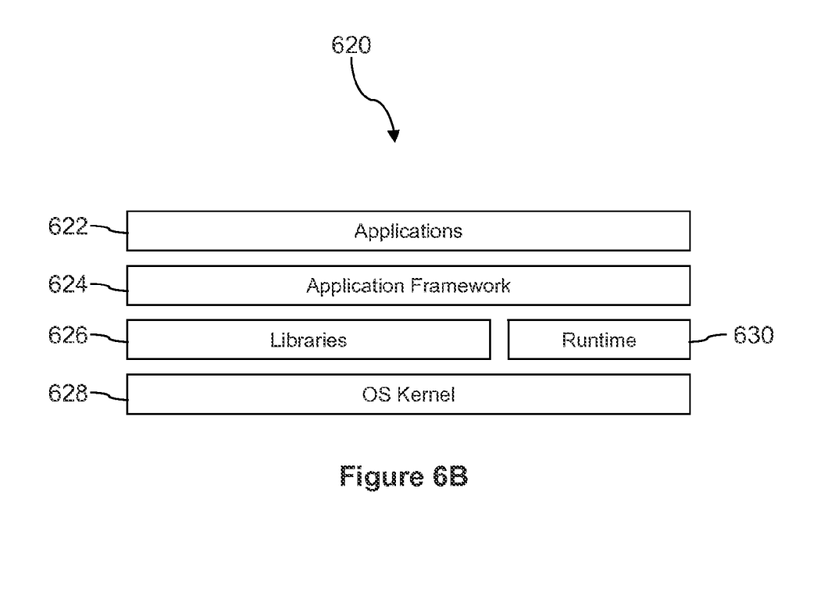
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
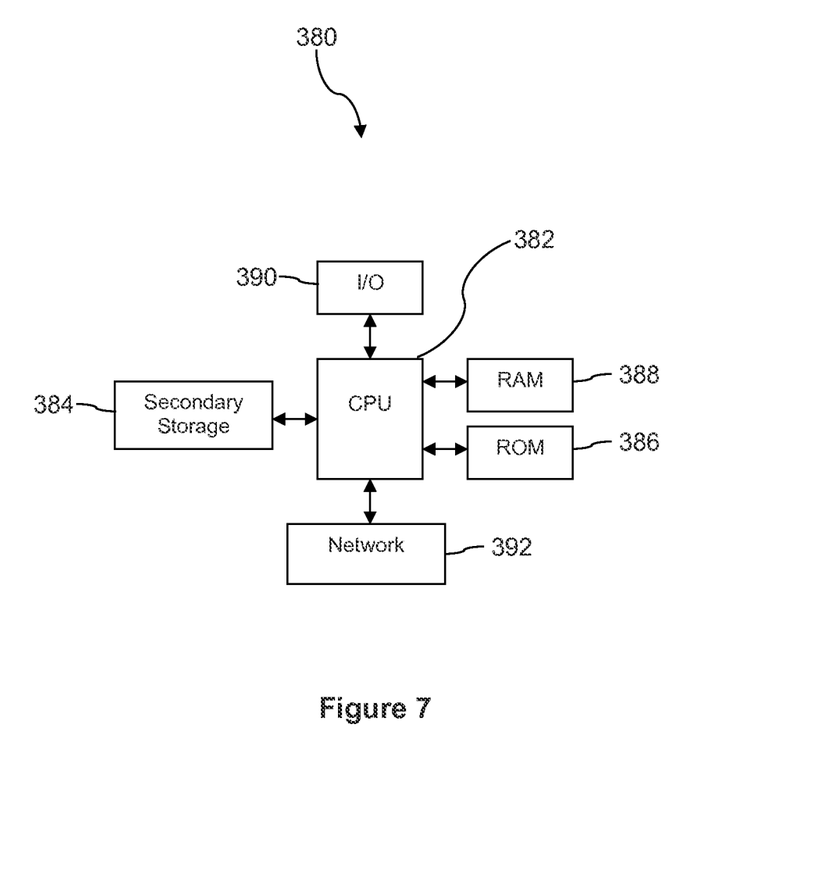
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
   a long-range radio transceiver;
   a processor;
   a memory;
   an input device;
   an application, stored in the memory, that when executed by the processor:
      receives input from the input device comprising text symbols having an initial format and at least one formatting specialty code corresponding to a desired transmission format for the text symbols, wherein transmission formats that are available for selection as the desired transmission format according to the at least one formatting specialty code comprise setting the text symbols preceding the formatting specialty code in upper case, adding a space between each of the text symbols, and inserting a line break after every blank space text symbol, and wherein the at least one formatting specialty code specifies one of the transmission formats,
   creates a short message comprising the text symbols formatted in the desired transmission format based on a formatting command identified by the at least one formatting specialty code, wherein the desired transmission format is different from the initial format, and
   transmits the short message via the long-range radio transceiver.

2. The mobile communication device of claim 1, wherein the formatting specialty code comprises a special symbol, the special symbol is not a numeral or a letter of the alphabet, and the text symbols are one or more of numerals, letters of the alphabet, or non-alphanumeric symbols that are not the special symbol.

3. The mobile communication device of claim 1, wherein the formatting specialty code consists of a pound sign (#) followed by two numerals.

4. The mobile communication device of claim 1, wherein the short message is one of a text (SMS) message or a multimedia message (MMS) message.

5. The mobile communication device of 1, wherein the short message does not comprise the formatting specialty code.

6. The mobile communication device of 1, wherein the long-range radio transceiver communicates wirelessly according to at least one of a code division multiple access (CDMA) wireless protocol, a global system for mobile communication (GSM) wireless protocol, a long-term evolution (LTE) wireless protocol, or a worldwide interoperability for microwave access (WiMAX) wireless protocol.

7. The mobile communication device of claim 1, wherein the application, when executed by the processor, is further configured to:
   receive a second input from the input device, wherein the second input comprises at least one functional specialty code corresponding to a desired non-formatting function of a receiving device, wherein the short message comprises the functional specialty code and is transmitted to the receiving device.

8. The mobile communication device of claim 7, wherein the functional specialty code causes the receiving device to modify a functional operation of the receiving device.

9. The mobile communication device of claim 8, wherein available functional operations for modification comprise preventing retransmission of the short message by the receiving device, deleting the short message from the receiving device after the receiving device present the short message to a user and removes the short message from a display of the receiving device, preventing a notification of the receiving device receiving the short message, and delaying the notification of the receiving device receiving the short message until a desired time, and wherein the functional specialty code specifies at least one of the available functional operations.

10. The mobile communication device of claim 1, wherein the application, when executed by the processor, is further configured to:
receive a second input from the input device, wherein the second input comprises at least one functional specialty code corresponding to a desired non-formatting function of the mobile communication device.

11. The mobile communication device of claim 10, wherein the functional specialty code instructs the mobile communication device to not transmit the short message via the long-range radio transceiver until a desired time.

12. The mobile communication device of claim 11, wherein the desired time is indicated by at least one of arrival of a predetermined time or expiration of a defined period of time.

13. The mobile communication device of claim 1, wherein the transmission formats that are available for selection as the desired transmission format according to the at least one formatting specialty code further comprise at least one of grammar checking and correction of the text symbols, spell checking and correction of the text symbols, and translation of the text symbols to a foreign language.

14. A method of creating and wirelessly transmitting a short message by a mobile communication device, comprising:
receiving input from a keyboard of a mobile communication device comprising text symbols having an initial format and at least one formatting specialty code corresponding to a desired transmission format for the text symbols, wherein transmission formats that are available for selection as the desired transmission format according to the at least one formatting specialty code comprise setting all the text symbols preceding the formatting specialty code in upper case, adding a space between each of the text symbols, and inserting a line break after every blank space text symbol, and wherein the at least one formatting specialty code specifies one of the transmission formats;
creating a short message comprising the text symbols formatted in the desired transmission format by a short message application executing on the mobile communication device based on a formatting command identified by the at least one formatting specialty code, wherein the desired transmission format is different from the initial format; and
transmitting the short message via a long-range radio transceiver of the mobile communication device.

15. The method of claim 14, wherein the formatting command identified by the at least one formatting specialty code commands the short message application to omit the short message from a thread of short messages previously sent to a destination identified in the short message, where the thread of previously sent short messages is stored on the mobile communication device.

16. The method of claim 14, wherein at least one functional specialty code is embedded in the short message and commands a counterpart short message application on a destination mobile communication device to present an alert of a received short message on the event of expiration of a delay indicated in the at least one functional specialty code embedded in the short message, on the event of arrival of a time indicated in the at least one functional specialty code embedded in the short message, on the event of the destination mobile communication device arriving at a location indicated in the at least one functional specialty code embedded in the short message, or on the event of the destination mobile communication device detecting motion.

17. The method of claim 14, wherein the formatting command identified by the at least one formatting specialty code further identifies a plurality of destination mobile communication devices, and wherein transmitting the short message via the long-range radio transceiver comprises transmitting the short message to each of the plurality of destination mobile communication devices identified by the at least one formatting specialty code.

18. The method of claim 17, further comprising:
presenting a user interface to prompt input of a definition of a message destination group specialty code and of destination addresses or destination phone numbers of members of the message destination group;
receiving input from the user interface of the definition of the message destination group specialty code and of the destination addresses or destination phone number of members of the message destination group; and
storing on the mobile communication device the definition of the message destination group specialty code and of the destination addresses or destination phone number of members of the message destination group.

19. The method of claim 14, wherein the transmission formats that are available for selection as the desired transmission format according to the at least one formatting specialty code further comprise at least one of grammar checking and correction of the text symbols, spell checking and correction of the text symbols, and translation of the text symbols to a foreign language.

* * * * *